Figure 1:
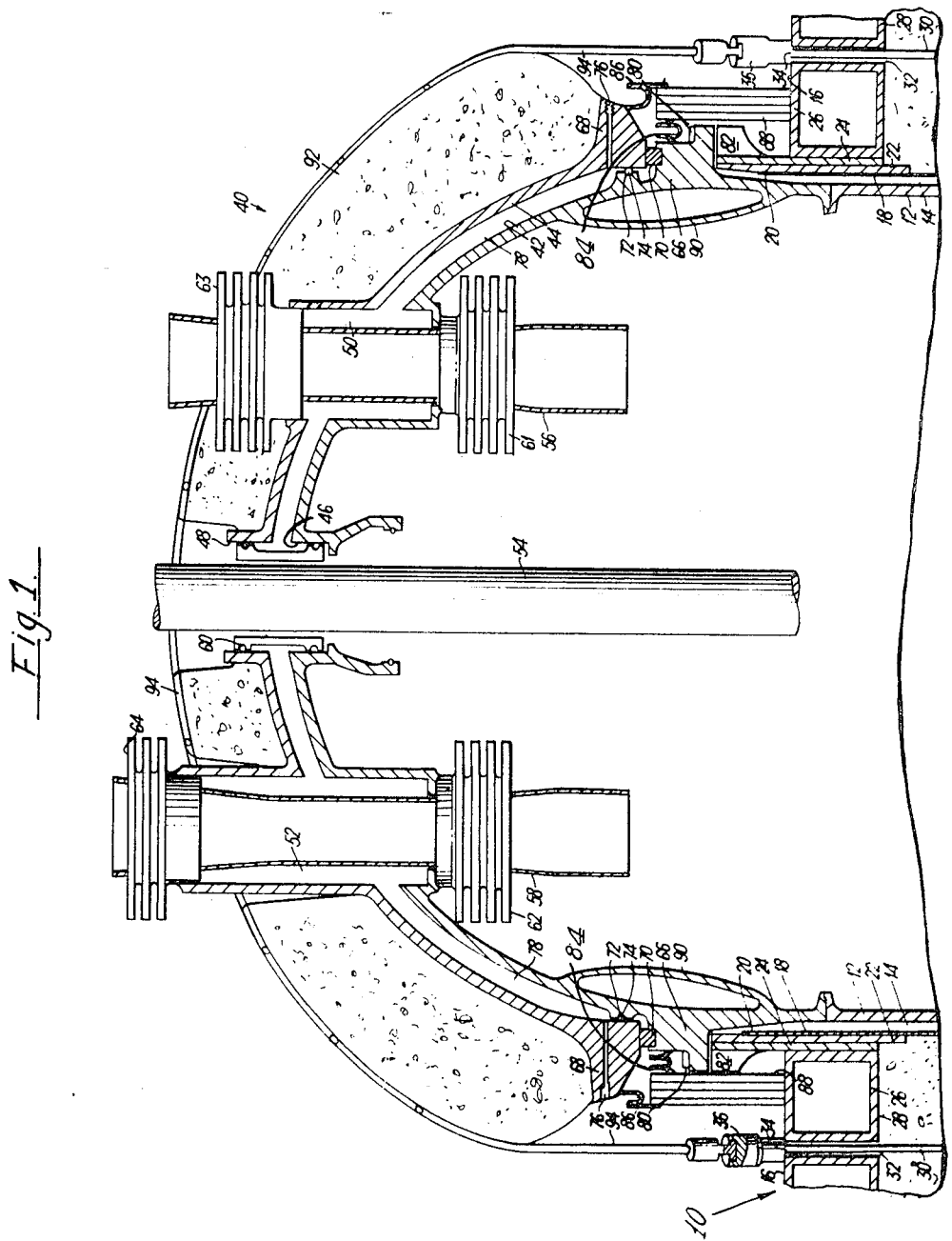

United States Patent  [15] 3,640,032
Jubb  [45] Feb. 8, 1972

[54] PRESSURE VESSELS

[72] Inventor: Albert Jubb, Kenilworth, England

[73] Assignee: Rolls Royce Limited, Derby, England

[22] Filed: July 17, 1969

[21] Appl. No.: 842,580

[30] Foreign Application Priority Data

July 17, 1968 Great Britain......................33,976/68

[52] U.S. Cl. ..........................................52/2, 52/20, 52/80, 52/224, 176/87, 220/3
[51] Int. Cl. ....................................E04h 7/20, G21c 13/08
[58] Field of Search................52/20, 80, 2, 224, 223; 220/3, 220/46, 55, 10; 176/87; 292/258, 259

[56] References Cited

UNITED STATES PATENTS

| | | | |
|---|---|---|---|
| 1,665,827 | 4/1928 | Tillmann | 220/3 X |
| 2,071,663 | 2/1937 | Smith | 292/258 |
| 2,360,391 | 10/1944 | Birchall | 292/259 X |
| 3,080,085 | 3/1963 | Jezowski | 52/80 |
| 3,237,358 | 3/1966 | Harris | 52/224 |
| 3,256,069 | 6/1966 | Peterson | 220/3 |
| 3,260,020 | 7/1966 | Pafin | 52/224 |
| 3,313,599 | 4/1967 | Boon | 220/3 X |
| 3,445,971 | 5/1969 | Desmarchais et al. | 52/224 X |

FOREIGN PATENTS OR APPLICATIONS 572,667 2/1958 Italy..........................................52/224

Primary Examiner—Alfred C. Perham
Attorney—Cushman, Darby & Cushman

[57] ABSTRACT

A prestressed pressure vessel having an opening in one of its external surfaces to the interior thereof, and a removable closure member for closing the opening. The removable closure member includes an inner lid for engaging the one surface and an outer lid spaced from the pressure vessel by the inner lid and forming with the inner lid a fluidtight enclosure therebetween in which fluid under pressure can be supplied so as to move the inner and outer lids relative one another. At least one securing cable extends over the outer lid and is connected to the vessel at at least two points, and when fluid under pressure enters the fluidtight enclosure, tension on at least one cable is increased and is operatively transferred by the outer lid to the inner lid for urging the inner lid into tighter engagement with the portion of the pressure vessel surrounding the opening.

10 Claims, 2 Drawing Figures

Inventor
ALBERT JUBB

By
Cushman, Darby & Cushman
Attorneys

PRESSURE VESSELS

This invention relates to pressure vessels and is particularly, but not exclusively, concerned with a prestressed concrete pressure vessel adapted to contain a power plant comprising a nuclear reactor and a closed-cycle gas turbine engine.

When such a power plant is contained in a prestressed concrete pressure vessel, it is desirable that at least the gas turbine engine should be removable from the pressure vessel for maintenance purposes. It is necessary, therefore, that the pressure vessel be provided with an opening through which the gas turbine engine may be withdrawn.

It is an object of the present invention to provide a closure member for such an opening, which closure member is removable and does not substantially detract from the integrity of the pressure vessel as a whole when in position.

According to the present invention as closure member for a pressure vessel comprises two relatively movable parts, one of which is adapted to close an opening provided in the pressure vessel and the other of which is spaced from the pressure vessel by said one part and adapted to be secured to the pressure vessel at at least two points by at least one cable or the like, the arrangement being such that, in use, relative movement of the parts increases the tension in said at least one cable, said tension being operative, via said other part, to urge said one part into engagement with the portion of the pressure vessel surrounding said opening.

Thus said parts may be arranged to define a fluidtight enclosure adapted to be connected to a source of high-pressure fluid, supply of said fluid causing said relative movement.

Preferably said one part comprises a first steel lid and said other part comprises a second steel lid which may be covered with a layer of concrete across which said at least one cable passes.

The invention also comprises a pressure vessel provided with a closure member in accordance with any of the above statements of invention.

In a preferred embodiment of the invention the prestressed pressure vessel is provided with a plurality of prestressing cables extending through the material of the pressure vessel in a direction substantially perpendicular to the surface of the pressure vessel containing said opening, said at least one cable passing over said other part and being secured between a pair of prestressing cables which are disposed on substantially opposite sides of said opening.

Preferably said other part is secured to the pressure vessel by a plurality of cables, each secured between a pair of prestressing cables which are disposed on substantially opposite sides of said opening. Alternatively said cables may be arranged in reticulate form over said other part.

The securing cables and the prestressing cables are preferably of steel.

The material of the pressure vessel may be concrete.

Figure 2:
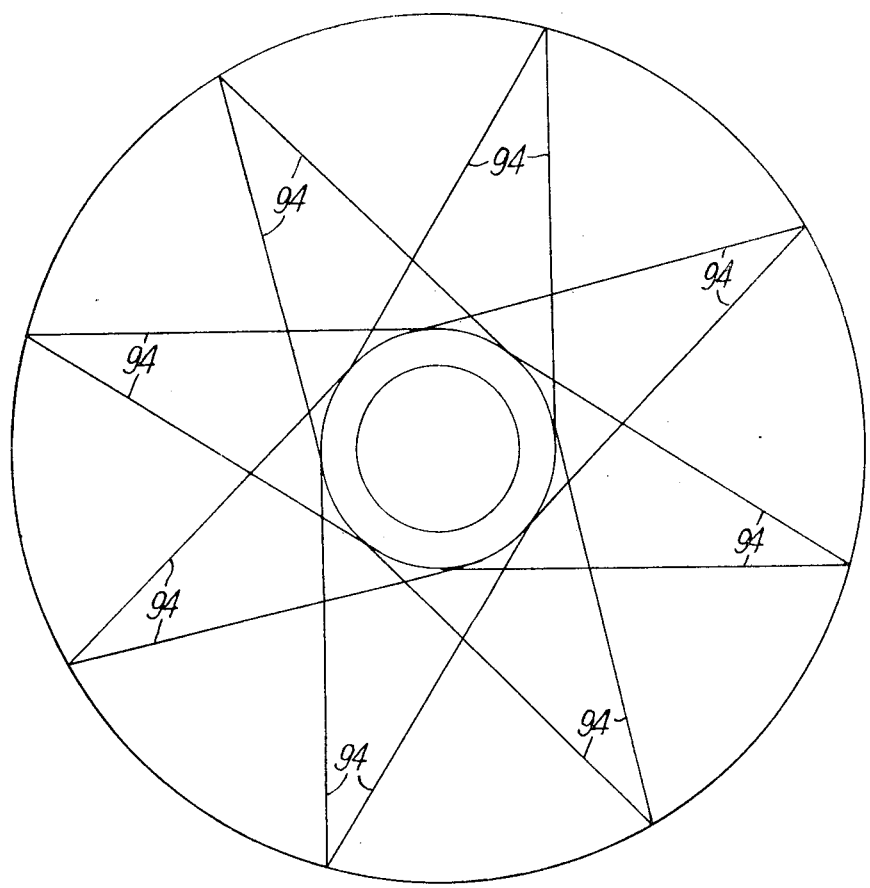

The invention will now be particularly described, merely by way of example, with reference to the accompanying drawings, of which:

FIG. 1 is a sectional view of part of a prestressed concrete pressure vessel in accordance with the invention, and FIG. 2 is a diagrammatic plan view of part of the pressure vessel of FIG. 1.

In FIG. 1 there is shown a prestressed concrete pressure vessel 10 adapted to contain a power plant (not shown) comprising a closed-cycle gas turbine engine having a plurality of heat exchangers in its flow path and a nuclear reactor arranged to heat the working gas of the gas turbine engine prior to its entry into the turbine or turbines of the engine. The gas turbine engine and its associated heat exchangers are contained within a substantially cylindrical pod 12 which is removably mounted in a substantially cylindrical recess 14 provided in the upper surface 16 of the pressure vessel 10. The recess 14 is provided with a thin steel liner 18 whose open upper end 20 is welded to the inner circumference of a steel band 22. The band 22 is welded within a further band 24 the lower part of which is in turn welded within a hollow flange member 26 located in a shallow circular recess 28 in the surface 16 coaxially surrounding the recess 14.

The pressure vessel 10 is provided with a large number of steel prestressing cables 30, only two of which are shown, which pass through tubes (not shown) formed or embedded in the concrete and which extend substantially perpendicularly to the surface 16. At least some of the cables 30 pass through holes 32 provided in the flange member 26. The recess 12 is thus surrounded by angularly spaced apart cables 30, all of which extend in a direction substantially parallel to its axis.

The cables 30 are secured by means not shown to the undersurface of the pressure vessel 10. During construction of the pressure vessel 10 considerable tension is applied to the cables 30 by means of, for example, hydraulic jacks so as to extend them; while the cables 30 are extended their upper ends 34 are secured within cylindrical fastening members 36 by means of split collets (not shown). Most of the fastening members 36 transmit the tension in their respective cables 30 to the surface 16 of the pressure vessel 10 directly, while those fastening members 36 secured to cables 30 which pass through the flange member 20 transmit the tension in their respective cables 30 to the remainder of the pressure vessel 10 through the flange member 26, except as will hereinafter be described.

The concrete of the pressure vessel 10 is therefore maintained in compression by the cables 30.

The recess 14 is provided with a closure member, generally indicated by 40, comprising an inner substantially hemispherical steel lid 42 adapted to cooperate with and close the pod 12 and an outer substantially hemispherical steel lid 44 concentric with and spaced from the lid 42.

The lids 42, 44 are relatively movable in a direction parallel to the axis of the recess 14 and are provided with respective aligned holes 46,48 coaxial with the recess 14 and with a number, e.g., four, of further pairs of aligned holes, two of which pairs are shown at 50,52. The axes of the pairs 50,52 of holes are substantially parallel to the axis of the recess 14. A power output shaft 54 of the gas turbine engine extends through the holes 46,48, while ducts 56,58 adapted to convey heat exchanger fluid to and from at least some of the heat exchangers of the gas turbine engine extend through the pairs 50,52 of holes respectively.

An annular labyrinth seal 60 coaxially surrounds the shaft 54 and sealingly engages the radially inner surfaces of the holes 46,48; further seals (not shown) may be provided to cooperate with the shaft 54 if desired. The external surfaces of the ducts 56,58 are sealed to the inner lid 42 by means of flexible bellows-type seals 61,62 respectively and to the outer lid 44 by means of flexible bellows-type seals 63,64 respectively; again, further seals (not shown) may be provided to cooperate with the ducts 56,58 if desired.

The lids 42,44 are provided with respective radially outwardly projecting flanges 66,68 which lie in planes parallel to the surface 16 and which are spaced apart by removable wedges 70. The inner lid 42 is provided in its radially outer surface with a circumferential groove 72, coaxial with the recess 14, containing a sealing ring 74 which sealingly engages the radially inner surface of the outer lid 44 in the region of the flange 68. A number of drillings 76 pass through the flange 68 of the outer lid 44 and communicate with the enclosed space 78 defined between the lids 42,44.

The flange 66 of the inner lid 42 is bolted at 80 to a radially outwardly projecting flange 82 provided on the band 24. Flexible metal sealing rings 84,86 are respectively welded, as will hereinafter be described, between the flange 66 and a composite metal band 88 and between the flange 68 and the band 88, the band 88 being welded to the flange member 26 and comprising a number of individual bands welded together.

The inner lid 42 is provided, in the region of the flange 66, with a radially inwardly projecting hollow annular portion 90 which constitutes a double skin over that part of the inner lid 42 not surrounded by the outer lid 44.

The radially outer surface of the outer lid 44 is covered with a layer 92 of concrete or other load-distributing material, across which a plurality of steel cables 94 extend. The cables 94 extend between substantially diametrically opposed points on the closure member 40, their disposition being shown somewhat diagrammatically in FIG. 3. It will be appreciated that the cables 94 must be arranged so as to avoid the shaft 54 and ducts 56,58.

Opposite ends of the cables 94 are respectively secured to substantially diametrically opposed fastening members 36 around the recess 14.

Alternatively, the cables 94 may be arranged in reticulate form over the concrete layer 92.

When it is desired to secure the closure member 40 in position on the pressure vessel 10, the pod 12, with the closure member 40 attached thereto by means not shown, is lowered into the recess 14 until the flange 66 of the inner lid 42 rests on the bands 22,24 and the bolts 80 are fastened. The cables 94 are then arranged across the layer 92 of concrete on the outer lid 44 as hereinbefore described, and tightly secured between respective fastening members 36.

A supply of high-pressure fluid, typically at a pressure of 1,000 pounds per square inch, is connected to the sealed space 78 between the lids 42,44 via the drillings 76, thus lifting the outer lid 44 with respect to the inner lid 42. The pressure of the fluid is chosen to ensure that the lid 44 exerts a greater force on the cables 94 than will be produced by their normal working loads. While the outer lid 44 is lifted, the wedges 70 are inserted in position between the flanges 66,68 so as to maintain the outer lid 44 in the lifted position. The supply of high-pressure fluid may then be disconnected and the sealing rings 84,86 welded in place.

The closure member 40 is thus urged into engagement with the portion of the pressure vessel 10 surrounding the recess 14 by at least a part of the tension in the cables 30 and the tension in the cables 94, the tension being transmitted to the portion of the pressure vessel 10 surrounding the recess 14 via the closure member 40 and the bands 22,24.

If desired, the pressure of the fluid in the space 78 may be chosen to ensure that the lid 44 exerts a force on the cables 94 sufficient to lift the fastening members 36 off the flange member 26, thus increasing the tension in the cables 30. In this case all the tension in the cables 30 and the cables 94 is transmitted to the portion of the pressure vessel 10 surrounding the recess 14 via the closure member 40 and the bands 22,24.

Alternatively, the cables 94 may be secured to the upper surface 16 of the pressure vessel 10 independently of the fastening members 36 and the cables 30. In this case the pressure of the fluid in the space 78 is chosen to ensure that the lid 44 exerts a greater force on the cables 94 than will be produced by their normal working loads.

It will be appreciated that when the closure member 40 is removed from the pressure vessel 10, the concrete of the pressure vessel 10 surrounding the recess 14 is still maintained in compression by the cables 30.

It will further be appreciated that materials other than concrete may be used to construct the pressure vessel 10, for example cast iron.

What is claimed is:

1. A closure member for closing an opening in a pressure vessel, said closure member comprising: two relatively movable lids, one lid being an inner lid arranged to engage a portion of the pressure vessel surrounding the opening and to close the opening and the other lid being an outer lid spaced from the pressure vessel by said inner lid, said inner lid and said outer lid defining a fluidtight enclosure therebetween; means for securing the outer lid to the pressure vessel at at least two points, said securing means including at least one cable extending across said outer lid and operatively secured to the pressure vessel at the two points; and means for supplying high-pressure fluid to said fluidtight enclosure to move said outer lid and said inner lid relative to each other to increase tension in said at least one cable with such tension being operatively transferred from the cable by the outer lid to the inner lid to thereby urge the inner lid into tighter engagement with the portion of the pressure vessel surrounding the opening.

2. A closure member as claimed in claim 1 in which said inner lid is steel and in which said outer lid is steel covered with a layer of concrete.

3. A closure member as claimed in claim 1 in which said securing means includes a plurality of cables extending across said outer lid, each of said cables being secured at its respective ends to said pressure vessel and all of said cables being arranged in reticulate form over said outer lid.

4. A closure member as claimed in claim 1 in which said securing means includes a plurality of cables extending across said outer lid, each of said plurality of cables being secured at its opposite ends to said pressure vessel on substantially opposite sides of said opening.

5. In combination: a pressure vessel having an opening in one surface of the same, said pressure vessel having a plurality of prestressing cables extending through the same in a direction perpendicular to the one surface containing the opening, the prestressing cables surrounding the opening; and a closure member for closing said opening, said closure member including two relatively movable lids, one lid being an inner lid arranged to engage a portion of the one surface of the pressure vessel around the opening for closing the opening and the other lid being an outer lid spaced from the pressure vessel by said inner lid, said inner lid and said outer lid defining a fluidtight enclosure therebetween, means for securing the outer lid to the pressure vessel at at least two points, said securing means including at least one cable extending across said outer lid and secured at its ends to a pair of said prestressing cables which are disposed on substantially opposite sides of said opening, and means for supplying high-pressure fluid to said fluidtight enclosure to move said outer lid and said inner lid relative to one another to increase tension in said at least one cable with such tension being operatively transferred from the cable by the outer lid to the inner lid for urging the inner lid into tighter engagement with the portion of the pressure vessel surrounding the opening.

6. The combination as claimed in claim 5, wherein said outer lid is secured to said pressure vessel by a plurality of cables, each of said securing cables being secured between a pair of said prestressing cables which are disposed on substantially opposite sides of said opening.

7. The combination as claimed in claim 5, wherein said securing means includes a plurality of securing cables passing over said outer lid, and wherein said plurality of securing cables are arranged in reticulate form over said outer lid.

8. The combination as claimed in claim 5 including means for maintaining tension in said at least one cable when high-pressure fluid is released from said fluidtight enclosure.

9. The combination as claimed in claim 8 wherein said last-mentioned means include wedge members inserted between said inner lid and said outer lid.

10. The combination as claimed in claim 5 wherein said pressure vessel is concrete and wherein said inner lid is steel and said outer lid is steel covered with a layer of concrete.

* * * * *